United States Patent
Piou et al.

(10) Patent No.: US 7,083,242 B2
(45) Date of Patent: Aug. 1, 2006

(54) ENDLESS FLEXIBLE TRACK WITH REINFORCING LAYERS FOR ALL-TERRAIN VEHICLES

(75) Inventors: Denis Piou, Villeblevin (FR); Olivier Phely, Thenisy (FR)

(73) Assignee: Otico, Longueville (FR)

(*) Notice: Subject to any disclaimer, the term of this patent is extended or adjusted under 35 U.S.C. 154(b) by 225 days.

(21) Appl. No.: 10/677,724

(22) Filed: Oct. 3, 2003

(65) Prior Publication Data

US 2004/0235600 A1   Nov. 25, 2004

(30) Foreign Application Priority Data

Oct. 7, 2002   (FR) .................................. 02 12426

(51) Int. Cl.
*B60C 55/24* (2006.01)
(52) U.S. Cl. .................. 305/167; 305/166; 305/170
(58) Field of Classification Search .............. 305/165, 305/166, 167, 170, 171, 177, 178, 183
See application file for complete search history.

(56) References Cited

U.S. PATENT DOCUMENTS

| 1,807,133 A * | 5/1931 | Pennington ................. 474/19 |
| 2,476,828 A * | 7/1949 | Skromme ................... 305/170 |
| 3,072,443 A * | 1/1963 | Yoe .............................. 305/34 |
| 4,721,498 A | 1/1988 | Grob |
| 5,221,392 A * | 6/1993 | Mai ............................. 156/184 |
| 6,079,802 A * | 6/2000 | Nishimura et al. ......... 305/157 |
| 2002/0067074 A1* | 6/2002 | Katayama et al. ......... 305/170 |
| 2002/0195877 A1* | 12/2002 | Tsuru et al. ................ 305/170 |
| 2004/0029669 A1* | 2/2004 | Phely ......................... 474/202 |
| 2004/0195915 A1* | 10/2004 | Sugihara et al. ............ 305/165 |

FOREIGN PATENT DOCUMENTS

| EP | 742382 | 11/1996 |
| JP | 3-295776 | * 12/1991 |
| WO | 01/53144 | 7/2001 |
| WO | 01/89913 | 11/2001 |

* cited by examiner

*Primary Examiner*—Russell D. Stormer
(74) *Attorney, Agent, or Firm*—Dennison, Schultz, Dougherty & MacDonald

(57) ABSTRACT

An endless flexible belt track produced from an elastomer comprises a steel cable (30) spirally wound in the thickness of the belt (12) and outer layers embedded in the thickness of the belt and formed successively from the turns (34) of the cable toward the outside, by: a first oblique layer (36) formed from wires that in turn form a first acute angle (A) to a perpendicular to the turns of the cable; a transversal layer (38) formed from wires that in turn form a right angle to the turns of the cable; and a second oblique layer (40) formed from wires that in turn form a second acute angle (B) to a perpendicular to the turns of the cable, the second acute angle (B) extending in the opposite direction to the first acute angle (A). Application to all-terrain vehicles.

7 Claims, 4 Drawing Sheets

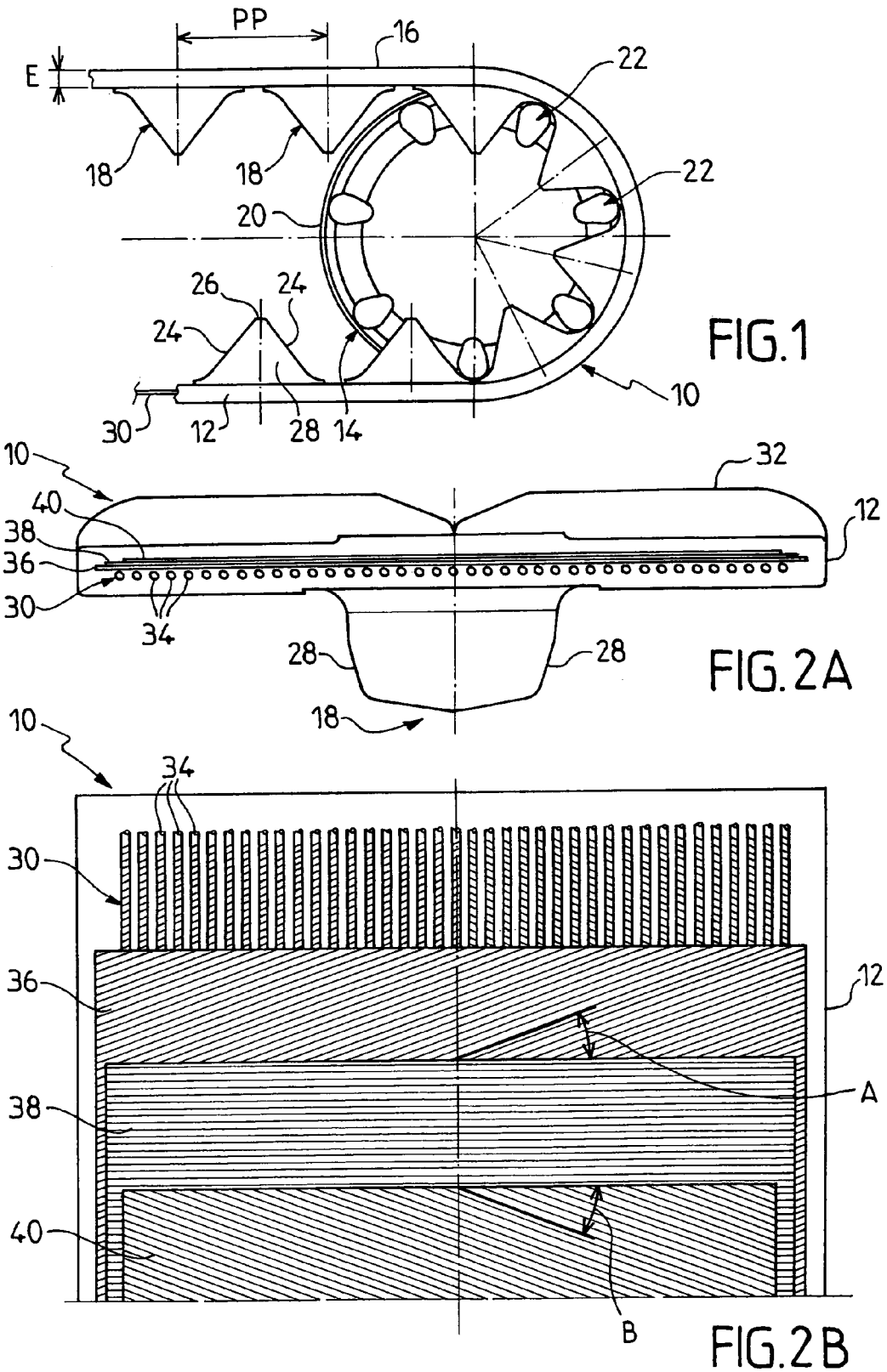

ENDLESS FLEXIBLE TRACK WITH REINFORCING LAYERS FOR ALL-TERRAIN VEHICLES

FIELD OF THE INVENTION

The invention relates to an endless flexible belt track intended in particular for all-terrain vehicles.

BACKGROUND OF THE INVENTION

It relates more particularly to an endless flexible belt track formed from an elastomer and comprising a steel cable spirally wound and embedded in the thickness of the belt to form more or less parallel longitudinal turns, as well as at least one layer of wires embedded in the thickness of the belt toward the inside and/or outside relative to the turns of the cable.

The wires comprising the layer or layers are cables, generally of steel, having a smaller diameter than the spirally wound cable. These wires may be formed from a single strand or filament, preferably from several assembled strands or filaments.

Endless flexible belt tracks of this type are already known and are being used increasingly to replace classical flexible belt tracks consisting of metal links joined together. These flexible tracks are used in numerous all-terrain vehicles such as agricultural machines and public works vehicles. A track of this type is known in particular from the patent FR-A-2 711 959 (93 13211), filed in the name of the applicant.

The endless flexible belt formed from an elastomer, generally with a natural rubber base, is wound round two end wheels of the vehicle, at least one of which is the driving wheel. The flexible belt is generally fitted on the outside with studs to improve adherence to the ground, and the inside with means for engaging with the driving wheel or wheels.

The belt is reinforced not only by the steel cable hectically wound in the thickness of the belt, but also by layer of wires which are embedded in the thickness of the belt, towards the inside and/or outside relative to the turns of the cable. Each of these layers consists of wires, in most cases of steel, which extend parallel with each other and which have a diameter smaller than the steel cable.

The design of these reinforcing layers, which serve as windings, present numerous practical difficulties.

In fact, these layers must be able to resist the extremely high stresses to which the track is subjected because of its winding tension and the obstacles it encounters. It should be remembered that the tension of the track is generally between 3 and 12 tons, and that the track is subject to major stresses in different directions, particularly when on a slope or bank or when it passes over obstacles of varying sharpness that are likely to damage it.

The tracks of prior art do not provide a solution to this problem.

OBJECT OF THE INVENTION

One of the objects of the invention is therefore to provide an endless flexible belt track, of the type described above, which enables the disadvantages mentioned to be overcome.

SUMMARY OF THE INVENTION

For this purpose, the invention proposes an endless flexible belt track of the above type that comprises outer layers formed successively from the turns of the cable toward the outside, by:

a first oblique layer formed from wires that in turn form a first acute angle to a perpendicular to the turns of the cable;

a transverse layer formed from wires that in turn form a right angle to the turns of the cable; and a second oblique layer formed from wires that in turn form a second acute angle to a perpendicular to the turns of the cable, the second acute angle extending in the opposite direction to the first acute angle.

The outer layers are therefore formed essentially by a transverse layer sandwiched between two oblique layers whose respective angles extend in opposite directions, one of the angles capable of being qualified as positive and the other negative.

This combination of three layers produces extremely favorable results. The transverse layer contributes to the transverse stiffness of the belt, which enables it to remain flat whilst facilitating its winding. This results in a very low power absorption during winding or rolling of the belt.

The two superimposed oblique layers contribute to increasing resistance to perforation as the track passes over an obstacle, for example a sharp obstacle. Moreover, the presence of these two oblique layers prevents lateral deviation or deformation of the belt, which helps gives the latter a curved, i.e. non-linear, shape.

The track according to the invention may also incorporate an additional transverse layer formed from wires forming a right angle to the turns of the cable and arranged after the second oblique layer toward the outside. The flexible belt therefore comprises four outer layers, the additional transverse layer contributing to increasing the transverse stiffness of the belt.

According to the invention, the endless flexible belt need not constitute an inner layer, i.e. a layer located between the turns of the cable and the inside of the belt.

In some cases, however, it may be advantageous for the track also to incorporate an inner transverse layer formed from wires that in turn form a right angle to the turns of the cable and arranged after the turns of the cable toward the inside.

According to the invention, the first acute angle is advantageously between 15 and 25 degrees, and similarly the second acute angle is advantageously between 15 and 25 degrees. Preferably, the first acute angle and the second acute angle have the same absolute value.

The layers of wires are advantageously formed from one coiled sheet of calendered wires having a diameter of between 1.0 and 2.5 millimetres. The wires in the wire layers are preferably of the multi-strand type. The cable is advantageously a multi-strand cable having a diameter of between 4 and 6 millimetres.

BRIEF DESCRIPTION OF THE FIGURES

FIG. 1 shows a partial side view of a flexible track wound around a driving wheel;

FIG. 2A shows a sectional view of an endless flexible belt in a first embodiment of the invention;

FIG. 2B shows an exploded elevation of the different layers of wires in the flexible belt shown in FIG. 2A;

DETAILED DESCRIPTION OF THE INVENTION

Figure 3A:
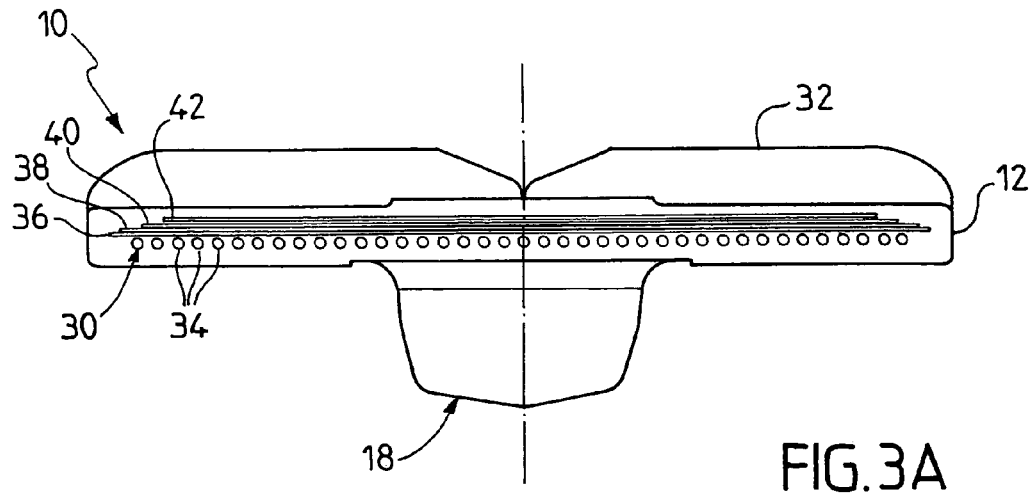
FIGS. 3A and 3B are views similar to those shown in FIGS. 2A and 2B for a second embodiment.

First of all, reference is made to FIG. 1, which shows a device driving a flexible track 10 wound around a driving wheel 14. Such a driving device may be fitted on all-terrain vehicles of different types, agricultural machines, public works vehicles, etc.

Track 10 is formed by an endless flexible belt 12 manufactured from an elastomeric material, with a natural rubber base for example, and is reinforced internally, i.e. in its thickness, by windings described below. These windings are formed by the superposition of warp and weft layers of materials generally comprising metal wires.

Endless belt 12 has on the outside a rolling surface 16 that is normally provided with studs (not shown in FIG. 1) and on the inside a row of lugs 18, located in the longitudinal direction of the belt and are in principle separated equidistantly by a pitch PP.

Driving wheel 14 is formed from two symmetrical rims 20 interconnected, at regular intervals, by driving cogs 22. These cogs are arranged in parallel on the periphery of the wheel and parallel with the generating lines of the latter.

As can also be seen in FIG. 1, lugs 18 have essentially the shape of a pyramid and each exhibit two oblique faces 24 terminating in an upper face 26 and two lateral faces 28.

Endless flexible belt 12, outside the studs (not shown) and pins, has a thickness E, which is typically between 26 and 30 millimetres, in most cases approximately 28 millimetres.

Belt 12 is internally reinforced, i.e. in its thickness, by a reinforcing cable 30, which is spirally and continuously wound to form turns that are generally parallel with each other.

Reference is now made to FIGS. 2A and 2B which show a first embodiment of the invention.

FIG. 2A shows endless flexible belt 12 with its studs 32 on the outside and its lugs 18 on the inside. In the thickness of the belt is embedded reinforcing cable 30, which is spirally wound to form longitudinal turns 34 that are essentially parallel to each other. As can be seen in FIGS. 2A and 2B, three outer layers are also embedded in the thickness of the belt, these layers being formed successively from turns 34 of the cable, toward the outside, by:

a first oblique layer 36 formed from parallel wires that in turn form an acute angle A to a perpendicular to the turns of the cable;

a transverse layer 38 formed from wires that in turn form a right angle to the turns of the cable; and a second oblique layer 40 formed from wires that in turn form a second acute angle B to a perpendicular to the turns of the cable, the second acute angle B extending in the opposite direction to the first acute angle A.

Angle A may be qualified as positive, and angle B as negative, or vice versa. The value of angle A is advantageously between 15 and 25 degrees, and the same applies to acute angle B.

Angle A and angle B preferably have the same absolute value, for example approximately 20 degrees.

As can be seen in FIGS. 2A and 2B, layers 36, 38 and 40 have different dimensions in the direction of the width of the belt to prevent the formation, on the edges of the layers, of hard points that could encourage the detachment of the elastomeric material in which the cable and reinforcing layers are embedded.

The layers of wires 36, 38 and 40 are each advantageously formed from the same coiled sheet of parallel, calendered wires having a diameter of between 1.0 and 2.5 millimetres. These wires are advantageously of the multi-strand type, but in some cases may be of the single strand type.

Cable 30 is normally of the multi-strand type and its diameter is generally between 4 and 6 millimetres.

The combination of transverse layer 38, sandwiched between oblique layers 36 and 40, contributes to improving the performances of the endless belt by imparting to it particularly advantageous properties. Transverse weft 38 confers a transverse stiffness to the belt, enabling it to remain flat and facilitating its winding.

The presence of the two oblique layers 36 and 40 increases resistance to perforation when the track passes over pointed or sharp obstacles. Moreover, the presence of these two oblique layers eliminates all risk of lateral deviation of the belt, i.e. curving of the belt, considering the projection of the belt on a horizontal plane.

Figure 3B:
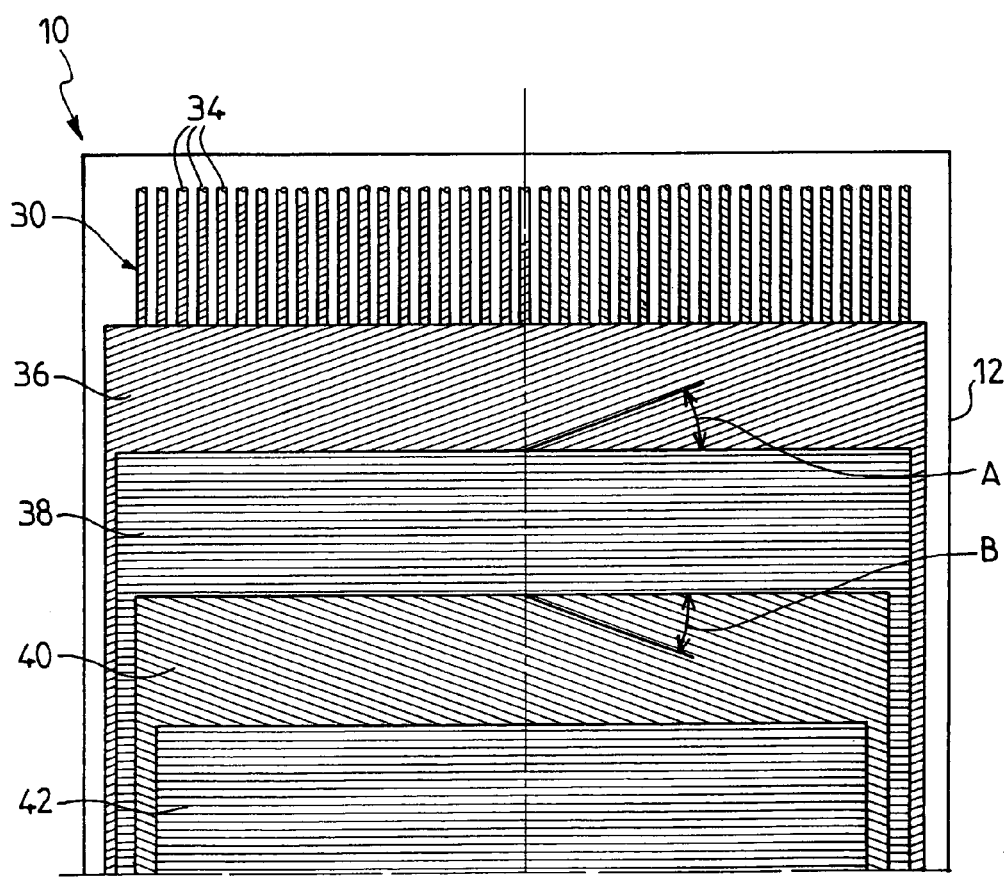

The embodiment shown in FIGS. 3A and 3B is similar to that shown in FIGS. 2A and 2B, except that the belt also incorporates an additional transverse layer 42 formed from wires that in turn form a right angle to the turns of the cable and arranged after the second oblique layer toward the outside. The presence of this additional layer contributes to increasing the transverse stiffness or rigidity of the belt, which is necessary for a rubber track to operate correctly.

Figure 4A:
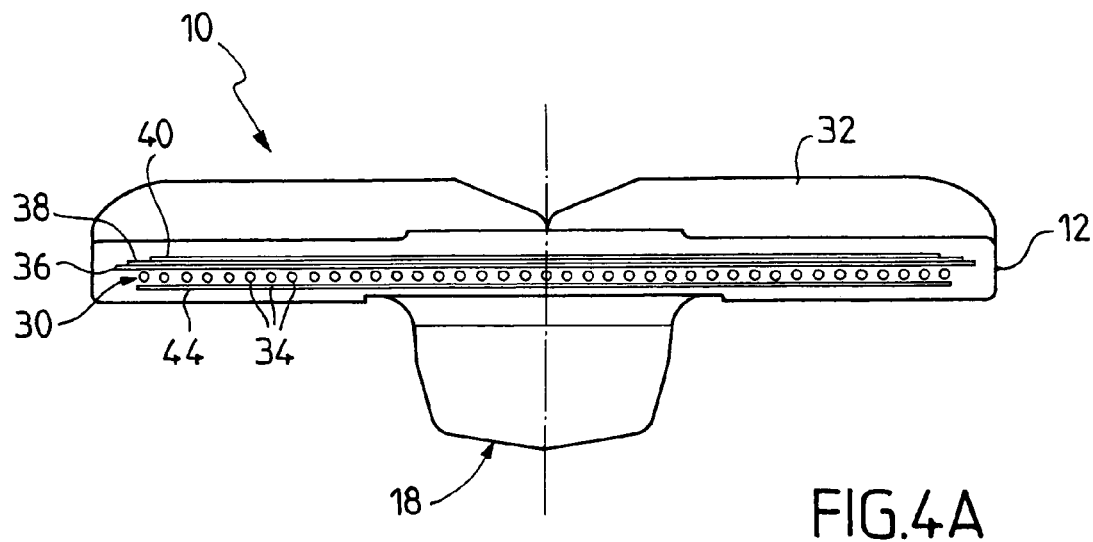
FIGS. 4A and 4B show views similar to those shown in FIGS. 2A and 2B for a third embodiment of the invention.
Figure 4B:
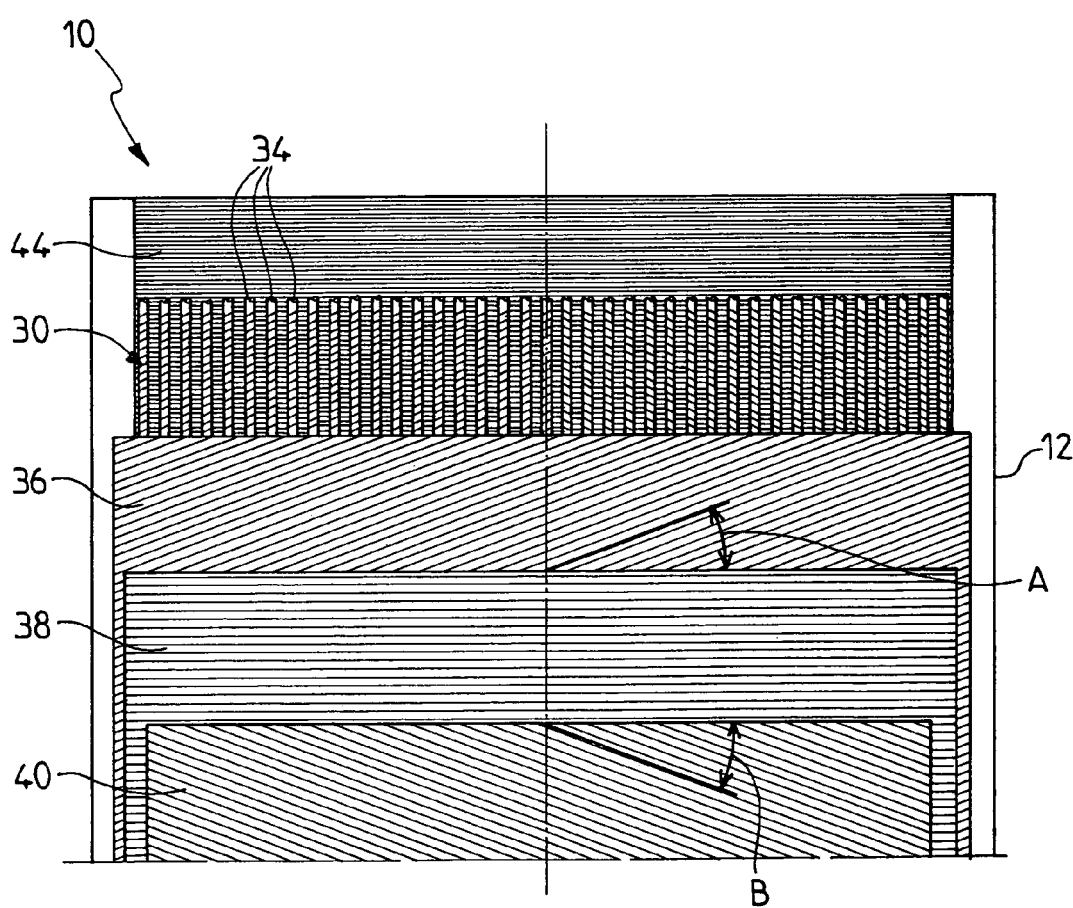

The embodiment shown in FIGS. 4A and 4B is similar to those shown in FIGS. 2A and 2B, except that the belt also incorporates an inner transverse layer 44 formed by wires forming a right angle to the turns of the cable and arranged after the turns of the cable toward the inside.

Figure 5A:
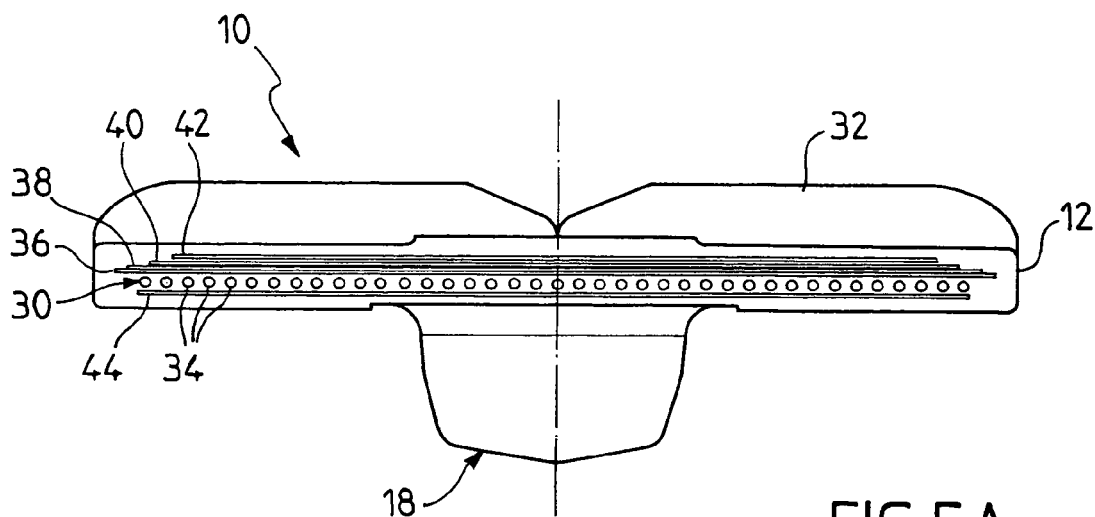
FIGS. 5A and 5B show views similar to those shown in FIGS. 3A and 3B for a fourth embodiment of the invention.
Figure 5B:
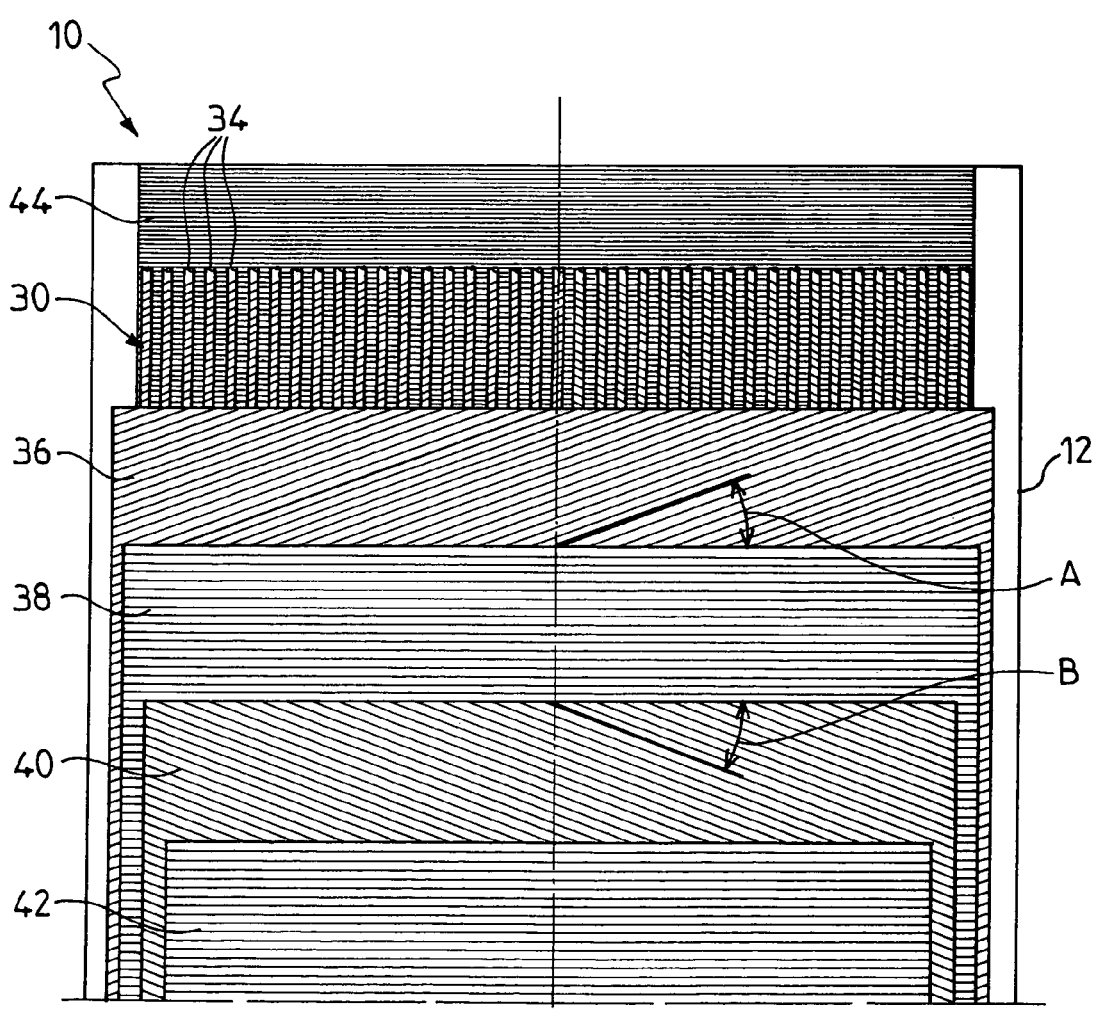

The embodiment shown in FIGS. 5A and 5B is very similar to those shown in FIGS. 3A and 3B, except that it also comprises an inner transverse layer 44, similar to that shown in FIGS. 4A and 4B.

The invention may have numerous variants and is not limited to the embodiments described above by way of example.

What is claimed is:

1. Endless flexible belt track formed from an elastomer and comprising a steel cable spirally wound and embedded in the thickness of said endless flexible belt to form substantially parallel, longitudinal turns, and at least one layer of wires embedded in the thickness of the endless flexible belt on at least one of the inside and outside relative to the turns of the cable, said endless flexible belt further comprising:

a first oblique layer formed from wires that form a first acute angle perpendicular to a longitudinal axis of the flexible belt track and to the turns of the cable;

a transverse layer formed from wires that form a right angle to the turns of the cable; and a second oblique layer formed from wires that form a second acute angle perpendicular to a longitudinal axis of the flexible belt track and to the turns of the cable, the second acute angle extending in the opposite direction to the first acute angle, wherein said transverse layer is disposed in between said first oblique layer on the bottom and said second oblique layer on the top, wherein said first oblique, transverse, and second oblique layers are formed above said parallel and longitudinal turns, wherein the first acute angle is between 15 and 25 degrees and the second acute angle is between 15 and 25 degrees.

2. Endless flexible belt track according to claim 1, further comprising a second transverse layer formed from wires that form a right angle to the turns of the cable and arranged outside or on top of the second oblique layer.

3. Endless flexible belt track according to claim 1, further comprising an inner transverse layer formed from wires that form a right angle to the turns of the cable and arranged inside the turns of the cable.

4. Endless flexible belt track according to claim 1, wherein the first acute angle and the second acute angle have the same absolute value.

5. Endless flexible belt track according to claim 1, wherein the layers of wires are each formed from a coiled sheet of calendered wires having a diameter of between 1.0 and 2.5 millimetres.

6. Endless flexible belt track according to claim 5, wherein the wires are of the multistrand type.

7. Endless flexible belt track according to claim 1, wherein the cable is of the multistrand type and has a diameter of between 4 and 6 millimetres.

* * * * *